United States Patent [19]

Jonke et al.

[11] 3,848,180

[45] Nov. 12, 1974

[54] PRESSURE TRANSDUCER

[75] Inventors: Joseph L. Jonke, Anaheim; Richard N. Clarke, Santa Ana, both of Calif.

[73] Assignee: Gulton Industries, Inc., Metuchen, N.J.

[22] Filed: Jan. 17, 1973

[21] Appl. No.: 324,549

[52] U.S. Cl.................... 323/51, 73/398 R, 323/68, 323/69, 336/20, 340/199
[51] Int. Cl............................................ G01r 33/00
[58] Field of Search............ 323/44, 51, 53, 68, 69; 73/393, 398 R; 340/199; 336/20, 30, 134

[56] References Cited
UNITED STATES PATENTS

| | | | |
|---|---|---|---|
| 3,185,973 | 5/1965 | Garber | 323/51 X |
| 3,555,405 | 1/1971 | Martin | 323/51 |
| 3,735,244 | 5/1973 | Gumtau et al. | 323/51 X |

Primary Examiner—Gerald Goldberg

[57] ABSTRACT

A pressure transducer of the type which utilizes movement of pressure sensitive capsule to move the core of a linear variable differential transformer. Compensation for change in the output of the linear variable differential transformer due to temperature change is accomplished by selecting a frequency of operation to produce a minimum change in output signal in response to temperature change. The linear variable differential transformer has a core which is fixed by adhesive to a compressed bifurcated shaft along only a portion of the area of contact therebetween. The shaft is fixed to the capsule at one side thereof by adhesive, the other side of the capsule being fixed to a capsule support plate by adhesive.

11 Claims, 9 Drawing Figures

PRESSURE TRANSDUCER

BACKGROUND OF THE INVENTION

1. Field of the Invention

This invention relates to pressure transducers of the type utilizing movement of a pressure sensitive capsule to move the core of a linear variable differential transformer, and, more particularly, to the compensating of the output of such a transformer for change in output signal as a result of change in temperature.

2. Description of the Prior Art

The use of linear variable differential transformers in pressure transducers by having the transformer core coupled to the pressure sensor is well known. An example of such a device is shown in U.S. Pat. No. 3,600,669. In such a device, a change in environmental temperature produces a change in the output of the transducer due solely to temperature. Various types of temperature compensation have been used heretofore, but all, if effective, have been comparatively costly. This change is principally a result of the change in output of the linear variable differential transformer. Consequently, such devices have not been useful over wide ranges of temperatures, as their output is temperature dependent as well as pressure dependent. In addition, such devices have been comparatively costly, being assembled on an individual basis and calibrated individually for zero calibration. The pressure sensitive capsules have been costly to produce, requiring extensive processing to reduce their temperature dependence and, if evacuated, provide the proper pressure differential after fabrication. Conventionally, such capsules have been formed by arc welding of two capsule halves, which have previously been formed and fittings attached for core shaft attachment and structural mounting. Two capsule halves are then welded and subsequently heat treated. Thereafter, the capsule is evacuated through an aperture in the fitting. This aperture must then be sealed. The welding produces stresses in the capsule which create pressure measurement inaccuracies, and, as the capsule has been evacuated, the stresses are not readily removed by heat treating.

Because of the inherent characteristics of the prior art transducers, it has been impossible to produce a low-cost pressure sensor of appreciable accuracy. Each transducer has been essentially hand made and individually tested and adjusted. Therefore, pressure transducers of good accuracy over a wide temperature range have been costly and time consuming to make and generally, therefore, have not been available at a low price, such as would be required in order to make economically practical a device of the required accuracy for wide spread use.

SUMMARY

In the transducer of the present invention, a linear variable differential transformer has its secondary windings connected in series with a capacitor to form a resonant circuit, the output of which is demodulated by a voltage doubler type demodulator. The excitation to the primary windings of the linear variable differential transformer is provided by a oscillator whose nominal output frequency is preselected, with respect to the resonant frequency, to provide a minimum change in output signal due to change in the environmental temperature of the transducer. In a particular embodiment, the oscillator output frequency is temperature dependent and is selected, so that a change in frequency of the oscillator produces a change in the magnitude of the output of the resonant circuit which compensates for the change in output signal magnitude of the transducer due to change in temperature.

The transducer has a pressure sensitive capsule, which in the prefered embodiment is evacuated. The capsule is formed by the electron beam welding of two identical capsule halves in a vacuum, after the halves have been heat treated to a zero thermal coefficient of elasticity. A bifurcated core shaft is attached to the capsule by adhesive, and the transformer core placed about a portion of the bifurcation so as to compress the bifurcation to hold the core in place. The core is ultimately fixed to the shaft by adhesive at only a portion of the area of contact therebetween, preferably that portion closest to the capsule. The capsule is attached to a capsule support plate, which mates in a press-fit with a portion of the housing so as to form a pressure chamber into which the pressure to be monitored may be introduced and align the core, carried by a shaft attached to the capsule, with the transformer. The transfomer primary windings are then excited, a predetermined pressure applied to the chamber and the position of the core adjusted, by means of the press-fit, to produce an output signal corresponding to the pressure applied, in order to zero-calibrate the transducer.

The electronic components of the transducer are divided between two printed circuit boards in order to reduce the space required therefor. The printed circuit boards are mounted at right angles to one another in the transducer. During fabrication, the printed circuit boards are held in this relative disposition by means of a multi-fingered metallic spring, whose fingers extend through apertures in the boards. During fabrication, the fingers are soldered into the printed circuitry on the boards to provide for electrical interconnection therebetween. The spring base is then sheared off, leaving the fingers as separate, electrically independent, connections between the two boards.

BRIEF DESCRIPTION OF THE DRAWING

The invention may be more readily understood by referring to the accompanying drawing in which.

DESCRIPTION OF THE PREFERRED EMBODIMENT

Figure 1:
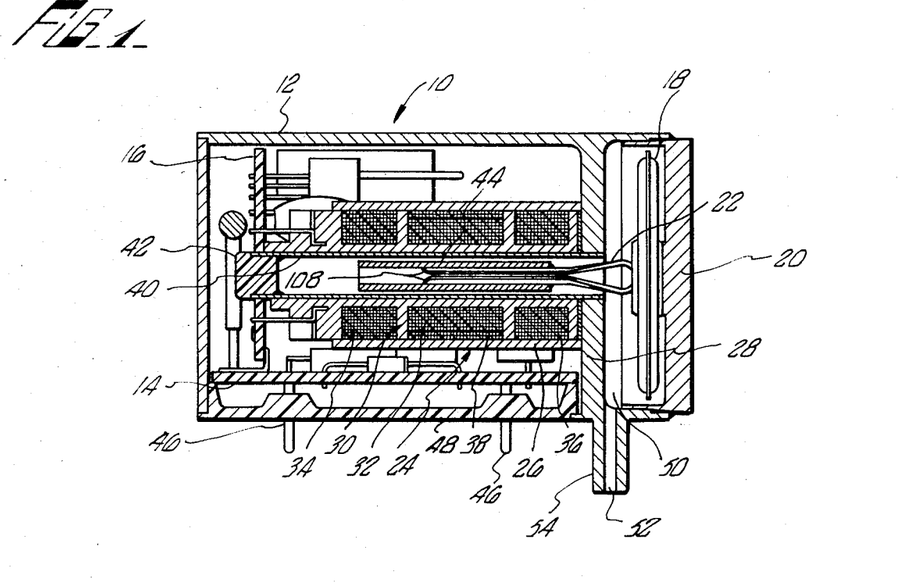
FIG. 1 is a view, in cross section, of the pressure transducer of the present invention.

Referring now to FIG. 1, there is shown in cross section the preferred embodiment of the present invention. In FIG. 1, a pressure transducer 10 has a housing 12 within which the transducer is disposed, together with its associated electronic circuitry. The electronic circuitry is shown as mounted on a pair of printed circuit boards 14, 16. The transducer has an evacuated capsule 18 which is mounted on a capsule support plate 20. Attached to the capsule 18 is a core shaft 22. A linear variable differential transformer 24 is enclosed in a transformer case 26 which abuts a front face 28 on the housing 12. The transformer 24 includes a bobbin 30 having a bifilar primary winding 32, a first secondary winding 34, a second secondary winding 36 and a drive winding 38 formed thereon. The transformer 24 is held in position within the housing 12 at one end by a bobbin tube 40 extending through the bobbin 30 and an appropriate aperture in the printed circuit board 16. The bobbin tube 40 is closed by an end plug 42. The opposite end of the bobbin tube 40 is open, and extends through an aperture in the front face 28. The bobbin tube 40, bobbin 30 and transformer case 26 are all bonded to the front face 28 by any conventional means. For example, a heat-cured epoxy resin can be used.

The core shaft 22 extends through the open end of the bobbin tube, and has mounted thereon a core 44 for the transformer. Extending from the printed circuit board 14 through the housing 12 and insulated therefrom are electrical terminals 46, only two of which are shown. Input and output terminals 46 extend through a terminal support plate 48 and are connected to the printed circuit board 14 to provide electrical input and output signals for the transducer. The capsule support plate 20, to which the capsule 18 is attached by bonding, is sealed to the housing 12 so as to provide a space 50 within which the capsule 18 is contained. An inlet passageway 52, formed in a pressure inlet 54, is utilized to communicate the pressure or vacuum to be applied to the capsule 18 from the pressure or vacuum source.

Figure 2:
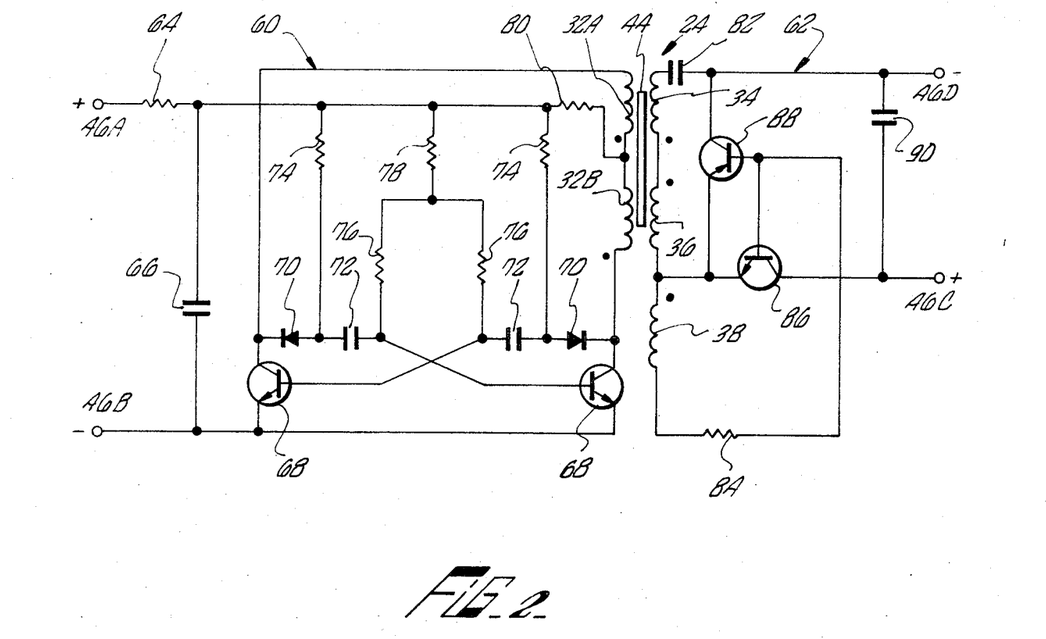
FIG. 2 is a schematic diagram of the electronic circuitry in the preferred embodiment of the invention.

Referring now to FIG. 2, there is shown a schematic diagram of the preferred embodiment of electronic circuitry for use in the practice of the invention. The circuitry in FIG. 2 consists generally of an oscillator 60, the linear variable differential transformer 24 and a demodulator 62. An input potential, which may be a nominal 12 volts DC, for example, is applied to a pair of input terminals 46A, 46B with the polarity indicated. Connected between the input terminal 46A and the oscillator 60 is a gain control resistor 64. Connected between the gain control resistor 64 and the input terminal 46B is an AC bypass capacitor 66.

The oscillator 60 is a conventional astable or free running multivibrator in the preferred embodiment, having transistor pairs 68, diode pairs 70, capacitor pairs 72, and resistor pairs 74 and 76. A frequency control resistor 78 is connected between the gain control resistor 64 and resistors 76 and provides for a fine frequency control, as will be described hereinafter. A current limiting resistor 80 is connected between the gain control resistor 64 and the junction of bifilar primary windings 32A, 32B. The windings 32A, 32B are connected in series between the current limiting resistor 80 and the collectors of the transistors 68.

The linear variable differential transformer secondary windings 34, 36 are differentially connected between a series capacitor 82 and the drive winding 38. The demodulator circuit 62, in addition to the drive winding 38 and series capacitor 82, includes a resistor 84, a first demodulator transistor 86, a second demodulator transistor 88 and an output circuit capacitor 90. The potential to which the output circuit capacitor 90 is charged appears across output terminals 46C, 46D with the polarity indicated.

The operation of the circuit of FIG. 2 will now be described. Application to the input terminals 46A, 46B of a 12 volt DC potential initiates oscillation of the oscillator 60 at a predetermined frequency, so as to excite the primary windings 32A, 32B of the linear variable differential transformer. Excitation of the primary windings 32A, 32B induces an output signal in the secondary windings 34, 36, as well as in the drive winding 38. Assume initially that the signal induced in the secondary windings 34, 36 is such that the potential existing at the junction between the secondary winding 36 and the drive winding 38 is negative with respect to the potential existing at the junction between the secondary winding 34 and the series capacitor 82. The signal existing at the junction between the drive winding 38 and resistor 84 is applied through the resistor 84 to the bases of the transistors 86, 88 and is more negative in potential than the signal existing at the junction between the drive winding 38 and secondary winding 36, which potential is applied to the emitters of the transistors 86, 88. Consequently, transistor 88 conducts and transistor 86 is non-conducting. Conduction of transistor 88 charged capacitor 82.

When the reverse polarity exists in the output windings 34, 36 and drive winding 38, the potential relationship is reversed, transistor 88 is non-conducting, and transistor 86 conducts, causing the charge on the series capacitor 82 as well as potential difference across the secondary windings 34, 36 to charge the output circuit capacitor 90. The output circuit capacitor 90 therefor rapidly builds up to a nominal output potential which is approximately double the peak value of the potential difference across the secondary windings 34, 36. This nominal output potential is applied to the output terminals 46C, 46D.

In one practical embodiment of the circuit of FIG. 2, capacitor 66 is 4.7 microfarads, capacitors 72 are 0.033 microfarads, capacitor 82 is 0.015 microfarads, and capacitor 90 is 4.7 microfarads; resistors 74 are 5,620 ohms, resistors 76 are 7,500 ohms, resistor 80 is 100 ohms and resistor 84 is 3,300 ohms; diodes 70 are type 1N914, transistors 68 and 86 are type 2N3904, and transistor 88 is type 2N3906; the transformer primary windings 32A, 32B each consist of 1,070 turns of number 40 AWG magnet wire, the secondary windings 34, 36 each consists of 1,300 turns of number 40 AWG magnet wire, and the inner diameter of the primary and secondary windings is 0.220 inches, the primary windings being 0.350 inches in width and the secondary windings being 0.200 inches in width. The drive winding 38 consists of 350 turns of number 40 AWG magnet wire and is wound on the primary windings 32A, 32B and insulated therefrom by insulation of 0.001 inch thickness. The capacitors 72, 82 preferably are polycarbonate or similar low temperature coefficient capacitors. The resistors, other than resistor 84, preferably are metal film resistors to provide a low temperature coefficient.

In such an embodiment, the output frequency of the oscillator is appxoximately 7,500 Hz. The combined inductance of the serially connected secondary windings 34, 36 is approximately 35 millihenries. The secondary windings 34, 36, together with the output capacitor 82, form a series resonant circuit whose resonant frequency is approximately 7,200 Hz.

The voltage drop across the gain control resistor 64 is a function of the input voltage and the current drawn by the oscillator. The voltage drop across the gain control resistor 64 therefore controls the slope of the $\Delta E/\Delta P$ curve to provide a desired nominal gain slope to compensate for component variations in production. Therefore, a change in the magnitude of the gain control resistor 64 can be utilized to decrease the overall sensitivity of the circuitry as may be required in order to meet specific accuracy tolerances for the device.

It is well known that the output of a linear variable differential transformer varies with the temperature of the transformer environment. This change in transformer output is the result of a number of individual parameters. Oscillators of the general type such as shown in FIG. 2 as the oscillator 60 usually increases in output frequency with respect to an increase in temperature, within the limits normally encountered in circuit operation. The particular electronic configuration shown in FIG. 2 exhibits such an increase due to a variety of parameters.

Figure 3:
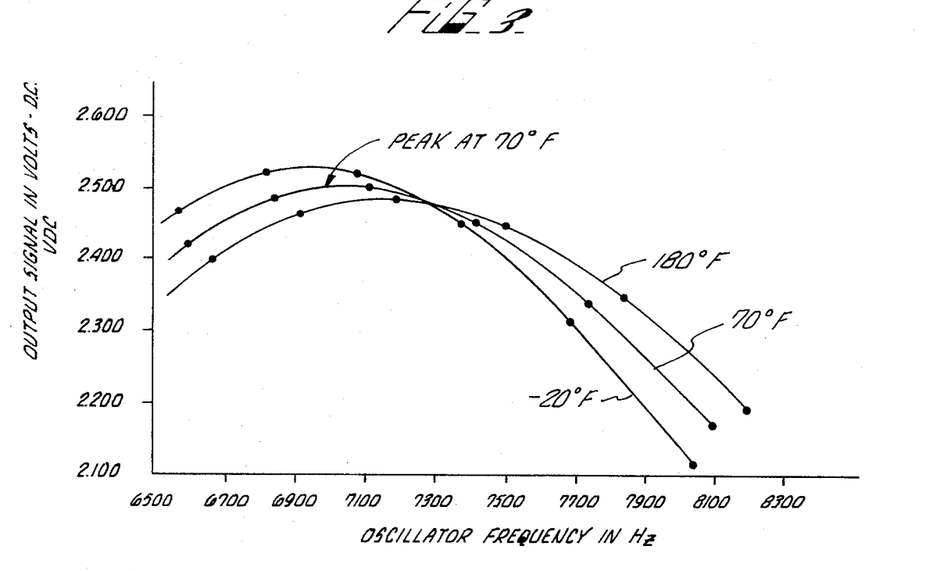
FIG. 3 is a graphical representation of the variation of transducer output with frequency for the embodiment of FIG. 2 at various temperatures.

In FIG. 3, there is shown the relationship between frequency and magnitude of transducer output at temperatures of minus 20° Fahrenheit, 70° Fahrenheit and 180° Fahrenheit. As will be seen, the output of the transducer is identical for all three temperature conditions at only one frequency, approximately 7,280 Hz. However, the oscillator of FIG. 2 is temperature sensitive as to both frequency and output signal magnitude. In other words, if the temperature of the oscillator of FIG. 2 is maintained constant, and the frequency varied, the magnitude of the output of the oscillator signal, applied to the windings 32A, 32B, will vary. Also, if the frequency of the oscillator is maintained constant, but the temperature changed, the magnitude of the signal applied to the windings 32A, 32B will change. Therefore, if the transducer illustrated as the preferred embodiment were operated at 7,280 Hz, at 70° Fahrenheit, and then the temperature of the oscillator changed to 180° Fahrenheit, the output of the transducer would change, since the temperature change would result in a change in frequency of oscillator operation.

Figure 4:
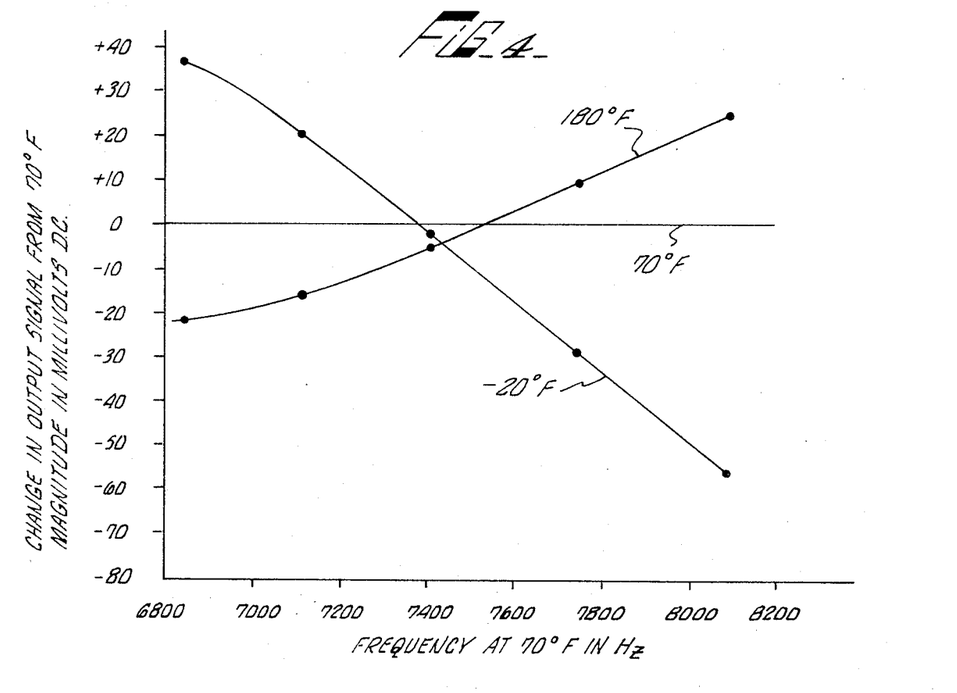
FIG. 4 is a graphical representation of the relationship between output magnitude and frequency derived from FIG. 3.

In order to determine the particular frequency which is the optimum operating frequency for the oscillator, with respect to minimum overall transducer output signal change due to temperature change, it is necessary to determine the relationship between temperature and output change for the transducer. FIG. 4 is a graphical representation of this relationship. The information contained in FIG. 3 was derived, utilizing the circuit of FIG. 2, by changing the value of the resistor 78 in 50 ohm increments. The actual frequencies which resulted, with a particular resistor value for resistor 78, at the three temperatures of FIG. 3, are shown in FIG. 3. These frequencies, and the outputs which result at the three temperatures, are utilized to provide the information contained in FIG. 4.

As is shown in FIG. 4, for the particular embodiment of circuitry of FIG. 2 and the transformer utilized, minimum overall change in output signal with temperature, taking 70° Fahrenheit as a reference, occurs at a frequency of approximately 7,450 Hz, although a range of frequencies from 7,400 to 7,500 Hz provides a generally minimum deviation with respect to the 70° temperature. At 7,450 Hz, the deviation at any temperature between minus 20° Fahrenheit and 180° Fahrenheit is less than about 5 millivolts maximum for an output signal of about 2.450 volts, or an error of 0.2 percent. Such an error is less than the tolerance as to electrical characteristics of the individual oscillator and transformer components.

In the practice of the invention, in its method aspects, it is necessary to make the determination set out with respect to FIG. 4, i.e., a determination of that frequency at which transducer output deviation with respect to temperature is a minimum. Having determined this frequency, the resistor 78 is selected to provide an oscillator output frequency corresponding thereto.

One of the specific advantages the present invention provides is a method for low-cost production of transducers which compensate for temperature variation. Once a particular design of transducer has been fixed, including the electronic and mechanical components, the determination for a "master" transducer as to optimum operation frequency is made as has been heretofore described. For other transducers in the production run, the optimum frequency of operation for minimum deviation with respect to temperature may vary from transducer to transducer. Individual transducers may exhibit a shift in frequency for the relationship shown in FIG. 3, but all will exhibit substantially identical curves.

In the mass production of the transducers, after the FIG. 3 characteristics have been determined for the master transducer, the frequency at which the output peak occurs at 70° Fahrenheit is apparent. In FIG. 3, such a peak occurs at approximately 7,030 Hz. The value of the resistor 78 which provides the peak output is therefore determined. This resistance value is compared to the value of resistance required to provide the output frequency from FIG. 4 for minimum deviation with temperature. The difference in the required resistance for peak and minimum variation with temperature is thereby determined. In the particular example given, peak output occurred for a resistor 78 value of 215 ohms, and minimum deviation, with 150 ohms, giving a difference of 65 ohms. This value will be the same for all transducers in the production run, within the permissible frequency range for minimum deviation.

For the succeeding transducers in the production run, the peak output frequency of an individual transducer is determined at room temperature. The value of the résistor 78 required to produce the peak is then changed by the value theretofore determined by the master transducer as required to shift output frequency from peak to minimum temperature deviation. In the particular example given, the resistance value would be decreased by about 65 ohms. The production line transducer is then provided with such a value for resistor 78, providing a shift in the frequency of the oscillator to the desired frequency for minimum deviation.

Depending upon the tolerance of the components and the accuracy required, such a determination may be made either as to all production line transducers, or to any selected percentage thereof during production. In either event, the necessity of the prior art devices for individually calibrating each transducer through the temperature range of operation to be encountered is eliminated. In other words, in producing prior art transducers, it was necessary, for a comparable transducer, to subject each transducer individually to the range of from minus 20° Fahrenheit to 180° Fahrenheit to provide calibration for output deviations due to temperature. Such obviously is an extremely time consuming and expensive task, adding greatly to the cost of the transducer. In the practice of the present invention, it is only necessary to make one determination, readily made by using a resistance decade box, of peak transducer output signal at room temperature. The resistance indicated in the decade box for peak output is then changed by a predetermined amount of resistance, and the appropriate value resistor utilized as a resistor 78 for the individual production transducer.

In the particular embodiment of oscillator illustrated in FIG. 2, the oscillator is temperature dependent, in that it shifts in frequency with respect to a change in temperature. If an oscillator is utilized which, by reason of design either does not change its output frequency with temperature or is maintained at a constant temperature while the transformer is subjected to a temperature change, output characteristics similar to that illustrated in FIG. 3 will again result. However, the frequency selected for oscillator operation will be that frequency at which, in the depiction according to FIG. 3, the various output signal curves intersect. In such an embodiment, it is not necessary to make the additional determination according to FIG. 4, since that frequency which the FIG. 4 determination would provide is shown in the FIG. 3 depiction as the point of intersection of the curves.

Figure 5:
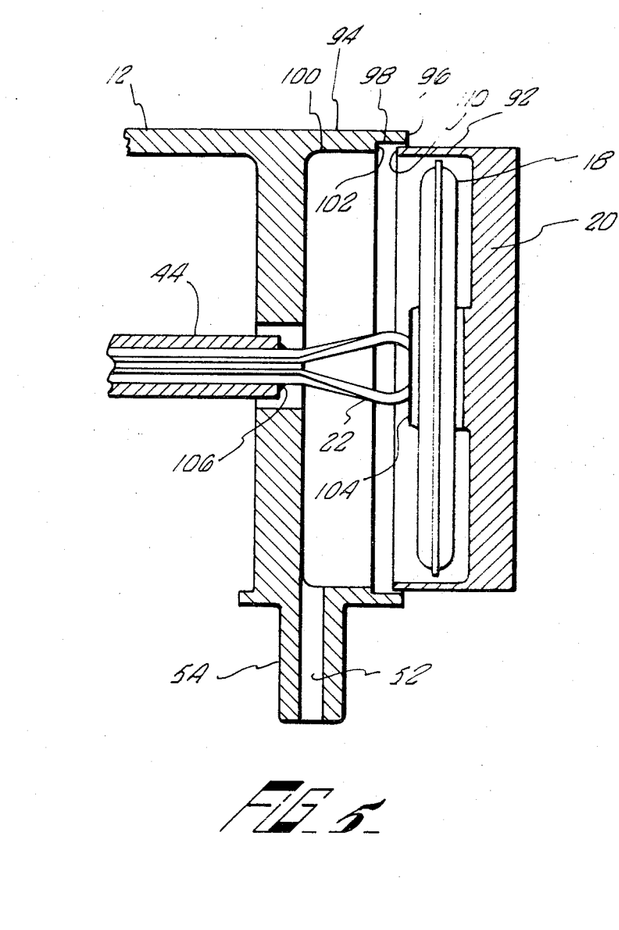
FIG. 5 is a view, partially in section, illustrating the initiation of the press-fit engagement between the transducer housing and capsule support plate.

Referring now to FIG. 5, there is shown, in section, a partial view of the housing 12 and the capsule support plate 20, illustrating the manner in which the capsule support plate is fitted into the housing. The capsule support plate 20 has a depending peripheral flange 92 which encloses the capsule 18. The housing 12 has a similar peripheral flange 94, of slightly greater outer diameter than the outer diameter of the flange 92. The outer diameter of the flange 92, however, is slightly greater than the inner diameter of the flange 94. The flange 94 terminates in a lip 96 and has a cylindrical recess 98 inward of the lip 96 formed by any conventional means. For example, the cylindrical recess may be formed by milling after the housing 12 has been cast. The outer diameter of the flange 92 is slightly less than the diameter at the recess 98, but exceeds the diameter of the cylindrical flange portion 100 inward from the recess 98. The recess 98 and central flange portion 100 meet at a shoulder 102.

In FIG. 5, the capsule support plate is shown as being inserted into the housing peripheral flange 94 to the extent that it is adjacent the cylindrical recess 98 but has not reached the shoulder 102. The core shaft 22 terminates in a base plate 104 which is attached to the capsule 18 by an appropriate adhesive, such as that heretofore indentified. The capsule 18 is similarly attached to the capsule support plate 20. The core 44 encloses the core shaft 22, which is of bifurcated configuration and is held is slight compression by the core 44. An adhesive is applied at the termination of the core 44 in the area nearest the capsule 18, as is shown by the adhesive 106, in order to fix the core to the shaft. Preferably, the adhesive is attached only to this contact area between the core and the shaft, although the adhesive may extend for a short distance within the core at this point. As is seen, the shaft has ends 108.

It has been found that, if adhesive is utilized to attach the shaft ends 108 to the core 44, as well as use of adhesive at the junction 106, an unnecessarily large error signal output, with respect to temperature, is introduced into the transformer. This error signal apparently results from the lateral and longitudinal expansion of the core 44 and the shaft 22 with temperature change. The shaft is, of necessity, made of a material which does not effect the magnetic field of the transformer, whereas the core is of necessity made of a material of high permeability. Consequently, the two elements are made of dissimilar materials, and so will have different thermal coefficients of expansion. If the relative positions of the core and shaft are fixed along a substantial portion of their contact, the resultant change in stress in the core with change in temperature will result in a change in the permeability of the core, causing an error signal.

For the same reason, it has been found that the utilization of the bifurcation in the shaft, so as to permit the radial expansion and contraction of the core without appreciably stressing the core and so changing the core permeability, avoids introduction of an error signal in the transformer output. While in the preferred embodiment shown, the adhesive is utilized at the junction 106 rather than the ends 108, the practice of the invention contemplates the utilization of adhesive at the ends 108 only, so that the junction 106 is a friction connection only, and relative lateral expansion and contraction of the core 44 with respect to the shaft 22 may occur at such point.

The core 44 is rigidly fixed laterally and axially with respect to the capsule support plate 20 by the shaft 22 and the adhesive use heretofore described. Consequently, as the cylindrical recess 98 is only very slightly greater in diameter than the peripheral flange 92, the recess 98 provides a self-aligning feature for the core 44. In assembly of the transducer, the bobbin 30, together with the transformer windings, is mounted on the bobbin tube 40, and so is fixed in the required disposition with respect to the housing 12. The capsule end plate 20, to which the core 44 is attached, is then inserted into the housing as is shown in FIG. 5, the cylindrical recess 98 thereby automatically aligning the core 44 with the bobbin tube 40 and therefore the transformer. As the capsule support plate 20 is pressed into the housing 12, a peripheral lip 110 at the end of the flange 92 will contact the shoulder 102. Further pressure upon the capsule support plate 20 will cause the relative deflection between the flange 92 and the housing peripheral flange 94, permitting the lip 110 to slide past the shoulder 102 into the central flange portion 100 so as to provide a press-fit of the plate 20 and the housing 12. The shoulder 102 thereupon forms a peripheral seal about the capsule support plate flange 92. This movement of the capsule support plate 20 relative to the housing 12 causes relative movement between the core 44 and the transformer 24.

In one aspect of the present invention, relative to the method of manufacture of the transducer, when the peripheral seal is formed by the shoulder 102 and the flange 92, a vacuum is applied to the space 50 through the inlet passageway 52 and the transformer is energized, producing an output signal which is a function of the vacuum applied and the position of the core 44 relative to the transformer 24. The capsule support plate 20 is then moved further into the housing 12, while the output of the transducer is monitored. When the output of the transducer core is to that output signal corresponding to the pressure being applied for the transducer design, the transformer core is so located that, upon removal of the vacuum, the transducer will be calibrated for zero and the various pressures to be monitored.

In actual production, once this calibration point has been achieved, it is desirable to fix the relative position of the capsule support plate 20 with respect to the housing 12. Therefore, adhesive is applied to either the peripheral flange 92 or the interior of the recess 98. When the transducer has been calibrated, the adhesive is caused to harden, so as to fix the relative positions of the housing 12 and capsule support plate 20.

Figure 6:
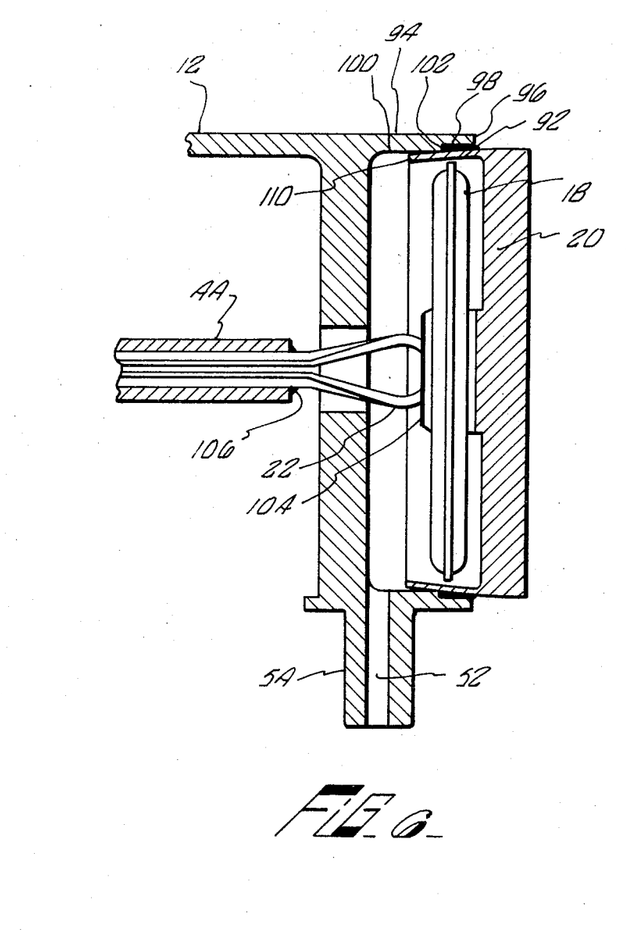
FIG. 6 is a view, partially in section, illustrating the completed press-fit engagement illustrated in FIG. 5.

Referring now to FIG. 6, there are shown the components of FIG. 5, when fixed in position with respect to one another. As will be seen, a relative deflection has taken place between the depending peripheral flange 92 and the housing peripheral flange 94. In addition, adjacent the shoulder 102 in the cylindrical recess 98, the adhesive is shown which holds the capsule support plate 20 and housing 12 in the relative dispositions shown.

Figure 7:
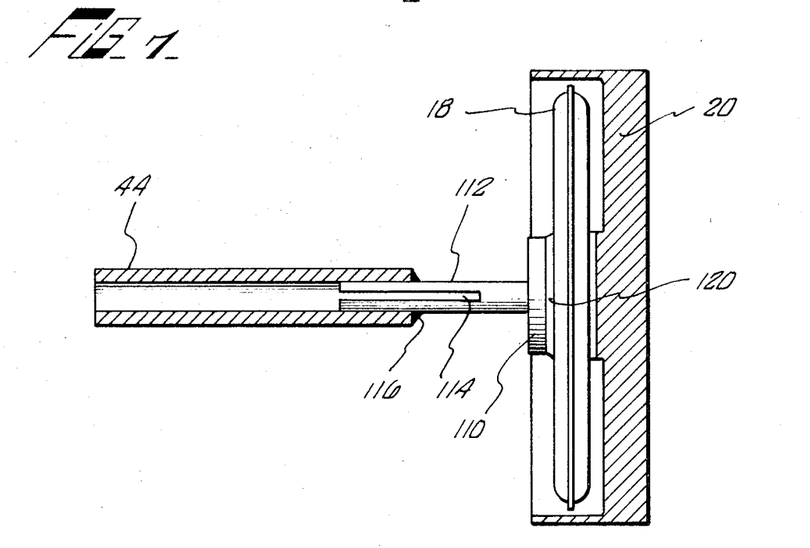
FIG. 7 is a view, in section, of an alternate embodiment of core shaft.

Referring now to FIG. 7, there is shown an alternate embodiment of the capsule support plate and related components. In FIG. 7, a shaft 112 is shown as an alternate embodiment of shaft 22 shown in FIGS. 1, 5 and 6. The shaft 112, rather than having a bifurcation or slot extending its entire length, has a slot 114 which extends through only a part of the shaft 112. However, it has been found, in the practice of the invention, that it is essential that the slot 114 extends beyond the core 44. The core 44 and shaft 112 meet at a junction 116 which is shown as including adhesive in order to fix the core to the shaft. The shaft terminates in a base plate 118 which is attached to the capsule 18 by adhesive 120.

Figures 8, 9:
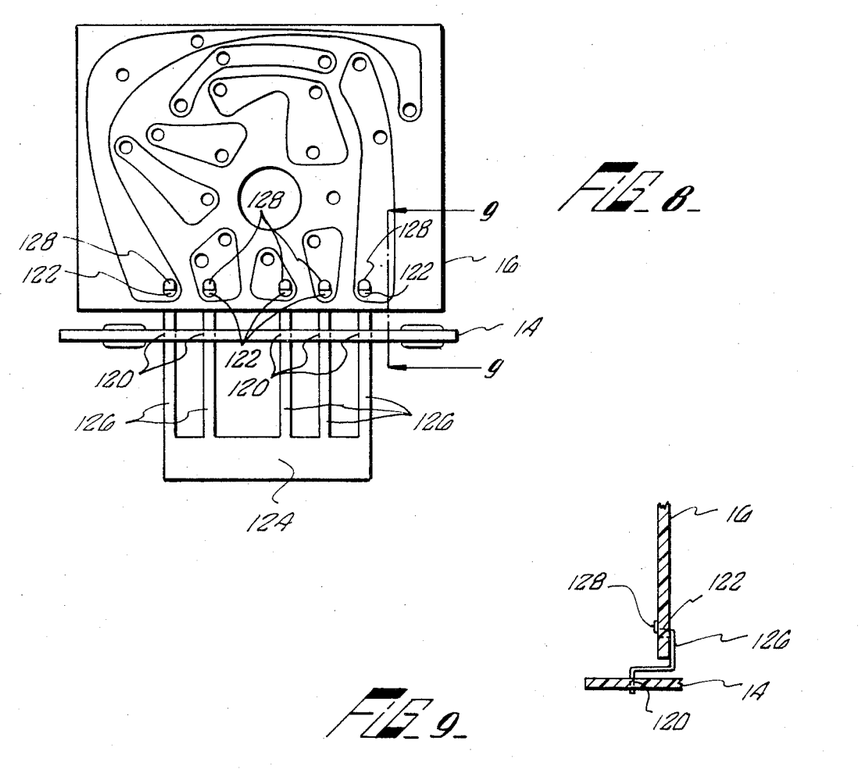
FIG. 8 is an end view of the printed circuit boards in the process of assembly.
FIG. 9 is a side elevation of a portion of the printed circuit boards of FIG. 8 after completion of assembly.

Referring now to FIG. 8, there is shown an end view of the printed circuit boards 14, 16 in the process of assembly. The printed circuit board 14 has five apertures 120, shown in dotted lines in FIG. 8, extending therethrough at one end thereof. Aligned with these five apertures 120 and the printed circuit board 14 are five apertures 122 in the printed circuit board 16. Each of the five apertures 122 in the printed circuit board 16 is an aperture in a portion of a printed circuit contained on the board. The printed circuit boards 14, 16 are connected together by a multi-fingered spring 124 which has five fingers 126. Each of the fingers 126 extends through one of the apertures 120 in the printed circuit board 14 and through one of the apertures 122 in the printed circuit board 16. The fingers 124 terminate in tips 128, which extend through the apertures 122 and upward therefrom, as will be more apparent in FIG. 9, so as to hold the printed circuit board 16 at right angles to the printed circuit board 14 during assembly of the electronic circuit components on the boards.

After assembly of the components on the printed circuit boards, the finger tips 128 are soldered to the printed circuits through which they extend on the printed circuit board 16, the fingers 126 are soldered at the apertures 120 to the printed circuit board 14, and the spring 124 is then sheared from the fingers 126 immediately below the printed circuit board 14. In FIG. 9, the completed printed circuit board structure is shown, illustrating the interconnection between the printed circuit boards 14, 16 by means of the fingers 126. As is apparent in FIG. 9, the finger tips 128 are the termination of the fingers 126 and extend through the apertures 122, the fingers 126 themselves extending through the apertures 120. In such a construction, during attachment of the printed circuit components to the board, the boards are held in the proper relative disposition to one another and, after soldering and shearing of the fingers 126, the fingers provide electrical interconnection between the two printed circuit boards 14, 16.

The capsule 18 is fabricated from iron-nickel-chrominum-tungsten alloys of the type which normally exist in an annealed state and are subject to precipitation hardening by heat treatment. Such alloys are described at page 323 of Physical Metallurgy For Engineers, by Donald S. Clark and Wilbur L. Varney, published by D. Van Nostrand Company, Inc., as exhibiting the additional property of maintaining a constant modulus of elasticity over a defined temperature range. An example of such an alloy which is commercially available is marketed under the trademark NISPAN-C.

The identical capsule halves are stamped from such a material prior to the material being heat treated. The capsule halves are then heat treated to a zero thermoelastic coefficient of elasticity, typically by being heated to a temperature of 1,250° F. to 1,300° F. for a period of about 3 hours. The capsule halves are then paired together, placed in a vacuum of 50 microns and electron beam welded around the rims thereof, so as to provide a peripheral seal. By the utilization of electron beam welding in a vacuum, an evacuated capsule is automatically provided. Consequently, the expensive and time consuming prior art requirements of welding, then evacuating and sealing the capsule, and heat treating after welding, are avoided.

The capsule produced by the method of the present invention is quite inexpensive, quite accurate, and readily lends itself to the attachment of the core shaft to it by use of an adhesive and attachment of the capsule itself to the capsule support plate by adhesive. In a particular embodiment in which an evacuated capsule is not required, but rather a capsule which operates with ambient pressure within the capsule, one of the capsule halves may be pierced, prior to welding, so that when the welded capsule is removed from the vacuum, ambient pressure is admitted into the capsule interior. In such a structure, if a pressure other than ambient is to be utilized, the capsule is subjected to the desired pressure.

The foregoing description of the preferred embodiment has dealt specifically with an adaptation of the invention for use in a pressure sensor. However, in the broadest sense, various aspects of the present invention may be used in any type of sensor in which a linear variable differential transformer is utilized. For example, such transformers may be utilized for dimensional measurement, the displacement of the transformer core indicating dimensional measurement. As such, the capsule 18 would not be utilized. However, the core shaft 22, core 44 and transformer 24 may be utililzed as shown in FIG. 1, with the core shaft being moved by any appropriate connecting structure to provide the core displacement indicative of the physical dimension being monitored. Consequently, in its broadest aspect, the invention is not necessarily limited to use in pressure sensors of the type shown, or pressure sensors in general. Rather, as to this aspect of the invention, the invention pertains to compensation of a linear variable differential transformer output with respect to temperature variation.

The invention claimed is:

1. A method for temperature compensating a plurality of like temperature compensated pressure transducers, each of the type having a linear variable differential transformer having a primary winding, a first secondary winding, a second secondary winding and a drive winding and whose output signal magnitude varies with temperature; a series capacitor of a value preselected to provide a series resonant circuit with the secondary windings of a selected frequency; an oscillator for excitation of the primary winding of the transformer and including a frequency control resistor for determining the nominal output frequency of the oscillator; means connecting the first secondary winding, the second secondary winding and the series capacitor in series to form said series resonant circuit; a demodulator of the voltage doubler type including the drive winding; and means for applying the series resonant circuit output to the demodulator to produce an output signal in response to primary winding excitation, in which, for a first one of said plurality of transducers, the two resistance values of the frequency control resistor which produce oscillator frequencies corresponding at a given pressure to the peak output signal and the output signal having minimum variation with temperature for the first transducer have been determined, comprising:

energizing other of the remainder of said transducers at a given pressure at a plurality of frequency control resistor resistance values to determine the resistance of frequency control resistances for said transducers which produce peak transducer outputs at the given pressure; and connecting in the oscillators of said transducers frequency control resistors whose resistances are reduced from their peak output resistance values by approximately the difference in resistance between the peak and minimum variation resistances of the first one of said transducers.

2. The method of claim 1 and including the step, subsequent to the connecting in the oscillator of one of the remaining transducers of a frequency control resistor whose resistance is reduced from its peak output resistance value by said difference in resistance, of connecting in the oscillators for succeeding ones of said transducers a frequency control resistor of the same resistance value as was utilized for said one of the remaining transducers.

3. The method of claim 2, and including the steps, subsequent to the connecting in succeeding ones of said transducers of a frequency control resistor of the same value as for said one of the remaining transducers, of selecting another one of the remainder of said plurality of transducers, not yet having a frequency control resistor connected in its oscillator;

determining the two resistance values of the frequency control resistor which produce oscillator frequencies corresponding at a given pressure to the peak output signal and the output signal having minimum variation with temperature for the selected one of the remainder of the plurality of transducers by energizing the oscillator at a plurality of temperatures and at a plurality of frequency control resistor resistance values; and thereafter reducing the value of the frequency control resistor for subsequent transducers from their peak output value by approximately the difference between the peak and minimum variation resistances of the selected another one of the remainder of said transducers rather than said difference with respect to said first one of said transducers.

4. A method for operating a linear variable differential transformer with minimum output signal magnitude variation due to temperature variation comprising connecting the linear variable differential transformer in an electronic circuit in which its primary winding is excited by an oscillator and its secondary windings are connected in series with a capacitor to form a series resonant circuit whose output is demodulated by a demodulator of the voltage doubler type;

determining the approximate oscillator frequency at which the demodulator output signal variation in magnitude with temperature is a minimum by energizing said oscillator and measuring the output for a plurality of temperatures and frequencies at a given transformer input; and operating the oscillator at said determined frequency.

5. In combination a linear variable differential transformer having a primary winding, a first secondary winding and a second secondary winding;

an output circuit including a series capacitor connected in series with the output windings to form a resonant circuit;

a demodulator of the voltage doubler type;

means for applying the series resonant circuit output to the demodulator to produce an output signal in response to primary winding excitation; and an oscillator for excitation of the primary windings at a frequency at which the variation in magnitude of the output signal with temperature is minimum.

6. In combination a linear variable differential transformer having a primary winding, a first secondary winding, a second secondary winding and a drive winding and whose output signal magnitude varies with temperature;

a series capacitor of a value preselected to provide a series resonant circuit with the secondary windings of a selected frequency;

means connecting the first secondary winding, the second secondary winding and the series capacitor in series to form said series resonant circuit;

a demodulator of the voltage doubler type including the drive winding;

means for applying the series resonant circuit output to the demodulator to produce an output signal in response to primary winding excitation; and an oscillator for excitation of the primary winding of the transformer at a preselected frequency, approximately equal to the selected resonant frequency, at which excitation frequency the variation in magnitude of the output signal with temperature is minimum, by means of an oscillator frequency control resistor whose resistance value is preselected to produce said excitation frequency as the oscillator output frequency.

7. In a pressure transducer, the combination of
a pressure sensitive capsule comprised of two capsule halves which have been bonded together by electron beam-welding in a vacuum;
a linear variable differential transformer core;
a core shaft connected between the capsule and the core, said core shaft having a bifurcation such that the core compresses the bifurcation and the bifurcation extends beyond one end of the core; and
adhesive means which affixes the core to the shaft at only one location in the area of contact between the core and the shaft.

8. The combination of claim 7, and including
a linear variable differential transformer including said core and having a primary winding, a first secondary winding and a second secondary winding;
an output circuit including a series capacitor connected in series with the output windings to form a resonant circuit;
a demodulator of the voltage doubler type;
means for applying the series resonant circuit output to the demodulator to produce an output signal in response to primary winding excitation; and
an oscillator for excitation of the primary winding at a frequency at which the variation in magnitude of the output signal with temperature is minimum.

9. The combination of claim 7, and including
a linear variable differential transformer including said core and having a primary winding, a first secondary winding, a second secondary winding and a drive winding and whose output signal magnitude varies with temperature;
a series capacitor of a value preselected to provide a series resonant circuit with the secondary windings of a selected frequency;
means connecting the first secondary winding, the second secondary winding and the series capacitor in series to form said series resonant circuit;
a demodulator of the voltage double type including the drive winding;
means for applying the series resonant circuit output to the demodulator to produce an output signal in response to primary winding excitation; and
an oscillator for excitation of the primary winding of the transformer at a preselected frequency, aproximately equal to the selected resonant frequency, at which excitation frequency the variation in magnitude of the output signal with temperature is minimum, by means of an oscillator frequency control resistor whose resistance value is preselected to produce said excitation frequency as the oscillator output frequency.

10. A temperature compensated pressure transducer including a linear variable differential transformer having a primary winding, a first secondary winding, a second secondary winding and a drive winding and whose output signal magnitude varies with temperature; a series capacitor of a value preselected to provide a series resonant circuit with the secondary windings of a selected frequency; an oscillator for excitation of the primary winding of the transformer and including a frequency control resistor for determining the nominal output frequency of the oscillator; means connecting the first secondary winding, the second secondary winding and the series capacitor in series to form said series resonant circuit; a demodulator of the voltage doubler type including the drive winding; and means for applying the series resonant circuit output to the demodulator to produce an output signal in response to primary winding excitation, produced by
selecting a first of a plurality of said transducers as a reference transducer;
determining the two resistance values of the frequency control resistor which produce oscillator frequencies corresponding at a given pressure to the peak output signal and the output signal having minimum variation with temperature for the reference transducer by enerziging its oscillator at a plurality of temperatures and at a plurality of frequency control resistor resistance values;
determining the frequency control resistance for a second of said transducers required to produce the peak transducer output at a given pressure by energizing its oscillator at a plurality of frequency control resistor resistance values; and
connecting in the oscillator of the second transducer a frequency control resistor whose resistance is reduced from its peak output resistance value by approximately the difference in resistance between the peak and minimum variation resistances of the reference transducer.

11. Apparatus for operating a linear variable differential transformer with minimum output signal magnitude variation due to temperature variation comprising means connecting the linear variable differential transformer in an electronic circuit in which its primary winding is excited by an oscillator and its secondary windings are connected in series with a capacitor to form a series resonant circuit whose output is demodulated by a demodulator of the voltage doubler type; and
means for limiting the oscillator operating frequency to within a selected frequency range for which the output signal variation in magnitude with temperature is a minimum.

* * * * *

UNITED STATES PATENT OFFICE
CERTIFICATE OF CORRECTION

Patent No. 3,848,180      Dated November 12, 1974

Inventor(s) JOSEPH L. JONKE and RICHARD N. CLARKE

It is certified that error appears in the above-identified patent and that said Letters Patent are hereby corrected as shown below:

| | |
|---|---|
| Col. 2, line 8 | "prefered" should read --preferred-- |
| Col. 4, line 34 | "charged" should read --charges-- |
| Col. 7, line 65 | "is held is" should read --is held in-- |
| Col. 9, line 38 | "extends" should read --extend-- |
| Col. 13, line 10 | "beam-welding" should read --beam welding-- |
| Col. 13, line 45 | "double" should read --doubler-- |

Signed and sealed this 14th day of January 1975.

(SEAL)
Attest:

McCOY M. GIBSON JR.
Attesting Officer

C. MARSHALL DANN
Commissioner of Patents